US007125211B2

United States Patent
Zoran

(10) Patent No.: US 7,125,211 B2
(45) Date of Patent: Oct. 24, 2006

(54) APPARATUS AND METHOD FOR DAMPING VIBRATION IN A MACHINE TOOL

(75) Inventor: Don Zoran, Cambridge (CA)

(73) Assignee: Racer Machinery International Inc., Cambridge ( * ) Notice: Subject to any disclaimer, the term of this patent is extended or adjusted under 35 U.S.C. 154(b) by 55 days.

(21) Appl. No.: 10/686,603

(22) Filed: Oct. 17, 2003

(65) Prior Publication Data

US 2005/0084355 A1   Apr. 21, 2005

(51) Int. Cl.
B23C 9/00 (2006.01)
B23Q 1/00 (2006.01)
F16F 7/00 (2006.01)
B23C 1/06 (2006.01)

(52) U.S. Cl. ............... 409/235; 409/238; 409/141; 408/143; 408/234; 188/378; 267/141; 267/140.11; 267/137; 248/636; 248/638; 248/562

(58) Field of Classification Search ............ 409/141, 409/235, 238; 408/143, 234; 188/378; 267/137, 267/140.5, 140.11, 141; 29/27 C; 248/636, 248/638, 562; 82/149, 163
See application file for complete search history.

(56) References Cited

U.S. PATENT DOCUMENTS

| | | | | |
|---|---|---|---|---|
| 3,169,412 | A * | 2/1965 | Weeks ................... 74/574.4 |
| 3,690,414 | A | 9/1972 | Aggarwal et al. |
| 3,814,357 | A | 6/1974 | Rontgen |
| 3,863,936 | A | 2/1975 | Farnam et al. |
| 4,413,938 | A * | 11/1983 | Kuczenski ............... 409/233 |
| 4,491,044 | A * | 1/1985 | Haas et al. .............. 408/143 |
| 4,560,289 | A * | 12/1985 | Wood, III ................ 384/99 |
| 4,699,180 | A | 10/1987 | Stefan et al. |
| 4,773,624 | A | 9/1988 | Affenzeller et al. |
| 4,981,056 | A * | 1/1991 | Brown et al. ............ 409/235 |
| 5,096,348 | A * | 3/1992 | Winkler et al. .......... 409/235 |
| 5,242,147 | A | 9/1993 | Kemeny |
| 5,325,750 | A * | 7/1994 | Carlyle et al. ........... 409/235 |
| 5,678,291 | A * | 10/1997 | Braun .................... 29/26 A |
| 5,692,728 | A | 12/1997 | Shiozawa |
| 5,765,818 | A * | 6/1998 | Sabatino et al. ......... 267/137 |
| 5,797,228 | A | 8/1998 | Kemeny |
| 6,213,721 | B1 | 4/2001 | Watkinson |
| 6,234,286 | B1 | 5/2001 | Feldberg |
| 6,341,467 | B1 | 1/2002 | Wycech |
| 6,382,603 | B1 | 5/2002 | Monson et al. |
| 2002/0081956 | A1* | 6/2002 | Bennett et al. ........... 451/398 |
| 2002/0110666 | A1* | 8/2002 | McCollough et al. ..... 428/138 |

FOREIGN PATENT DOCUMENTS

| | | |
|---|---|---|
| CA | 1088963 | 11/1980 |
| CA | 1133875 | 10/1982 |
| WO | PCT/CA04/001819 | 10/2004 |

* cited by examiner

Primary Examiner—Erica Cadugan

(57) ABSTRACT

A machine tool for performing a machine tool function including components adapted to cooperate with each other to execute the machine tool function. The machine tool has a number of constituent parts and a number of sheets of damping material. Each component includes constituent parts with sheets of damping material interposed between the constituent parts. The sheets dampen vibration of the machine tool during performance of the machine tool function.

10 Claims, 4 Drawing Sheets

APPARATUS AND METHOD FOR DAMPING VIBRATION IN A MACHINE TOOL

FIELD OF THE INVENTION

This invention relates to machine tools.

BACKGROUND OF THE INVENTION

Various machine tools are known which perform material removal processes such as turning, boring, drilling, reaming, threading, milling, shaping, planning, and broaching. Typically, a machine tool is designed to perform a machine tool function which includes one or more of the material removal processes on a workpiece. In a typical machine tool, various components thereof interact in one or more predetermined patterns to execute the machine tool function. The components may move relative to each other while executing the machine tool function.

Known machine tools typically produce a great deal of vibration when operating. The vibration of the machine tool can be so great that it causes a number of problems, such as premature tool failure, poor surface finish, damage to the workpiece, and damage to the machine itself.

In known machine tools, each component is usually formed to have the largest mass feasible. This is because a larger mass is typically thought to assist in absorbing vibration. In order to achieve the largest monolithic mass for a particular component, the component is usually formed by casting. However, casting is relatively expensive and time-consuming.

For example, a machine tool 10 of the prior art is shown in FIGS. 1A and 1B. (As will be described, the remainder of the drawings illustrate the present invention.) As shown in FIGS. 1A and 1B, the prior art machine tool 10 includes, among other components, a base 12 and a column 14. In the prior art, the base 12 and the column 14 typically comprise components which are castings and are as large as possible given the design of the machine tool 10, to maximize the vibration absorbed by the components 12, 14.

However, as is well known in the art, the prior art machine tools which include components which are castings still produce relatively large vibrations when operating, resulting in the problems described.

There is therefore a need for an improved machine tool in which vibration of the machine tool is reduced.

SUMMARY OF THE INVENTION

In a broad aspect of the present invention, there is provided a machine tool for performing a machine tool function. The machine tool includes a number of components adapted to cooperate with each other to execute the machine tool function. The machine tool has a number of constituent parts and a number of sheets of damping material. Each component includes at least two constituent parts and a sheet, and the sheet is interposed between the constituent parts. The sheet limits vibration of the machine tool during performance of the machine tool function.

In another embodiment, each constituent part includes a first surface which is adapted to cooperate with a second surface on an adjacent constituent part to define a slot. The sheet is receivable in the slot, so that the sheet is interposed between the first surface and the second surface to form each component.

In yet another embodiment, each sheet of damping material is substantially planar.

In an alternative embodiment, each sheet is substantially non-resilient.

In yet another embodiment, each sheet is substantially impermeable.

In yet another embodiment, each sheet of damping material is polyvinylchloride.

In another alternative embodiment, the invention includes a method of damping vibration of a machine tool. The machine tool is adapted to perform a machine tool function and includes a plurality of machine tool components adapted to cooperate with each other to execute the machine tool function. The method includes the steps of, first, providing at least two constituent parts for each component. Second, a sheet of damping material is provided. Next, each component is formed by interposing the sheet of damping material between the constituent parts. Finally, the components are assembled into the machine tool.

BRIEF DESCRIPTION OF THE DRAWINGS

The invention will be better understood with reference to the drawings, in which.

DETAILED DESCRIPTION OF THE PREFERRED EMBODIMENT(S)

Figure 1A:
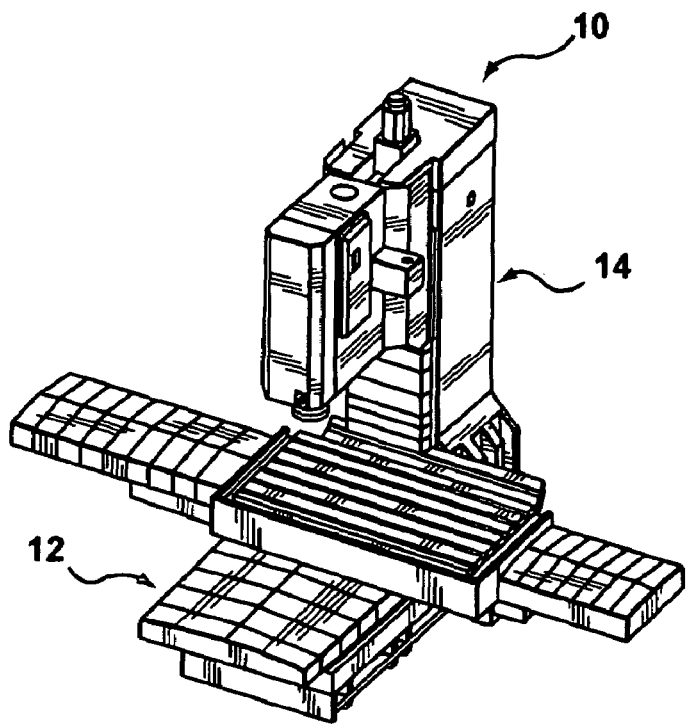
FIG. 1A (also described previously) is an isometric view of a machine tool of the prior art from the front, showing base and column components.
Figure 1B:
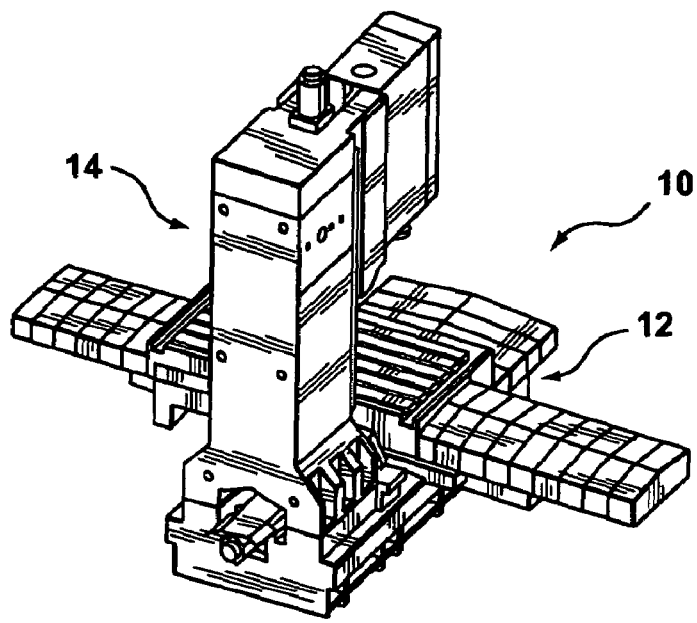
FIG. 1B (also described previously) is an isometric view of the machine tool of the prior art of FIG. 1A, from the rear thereof.
Figure 2:
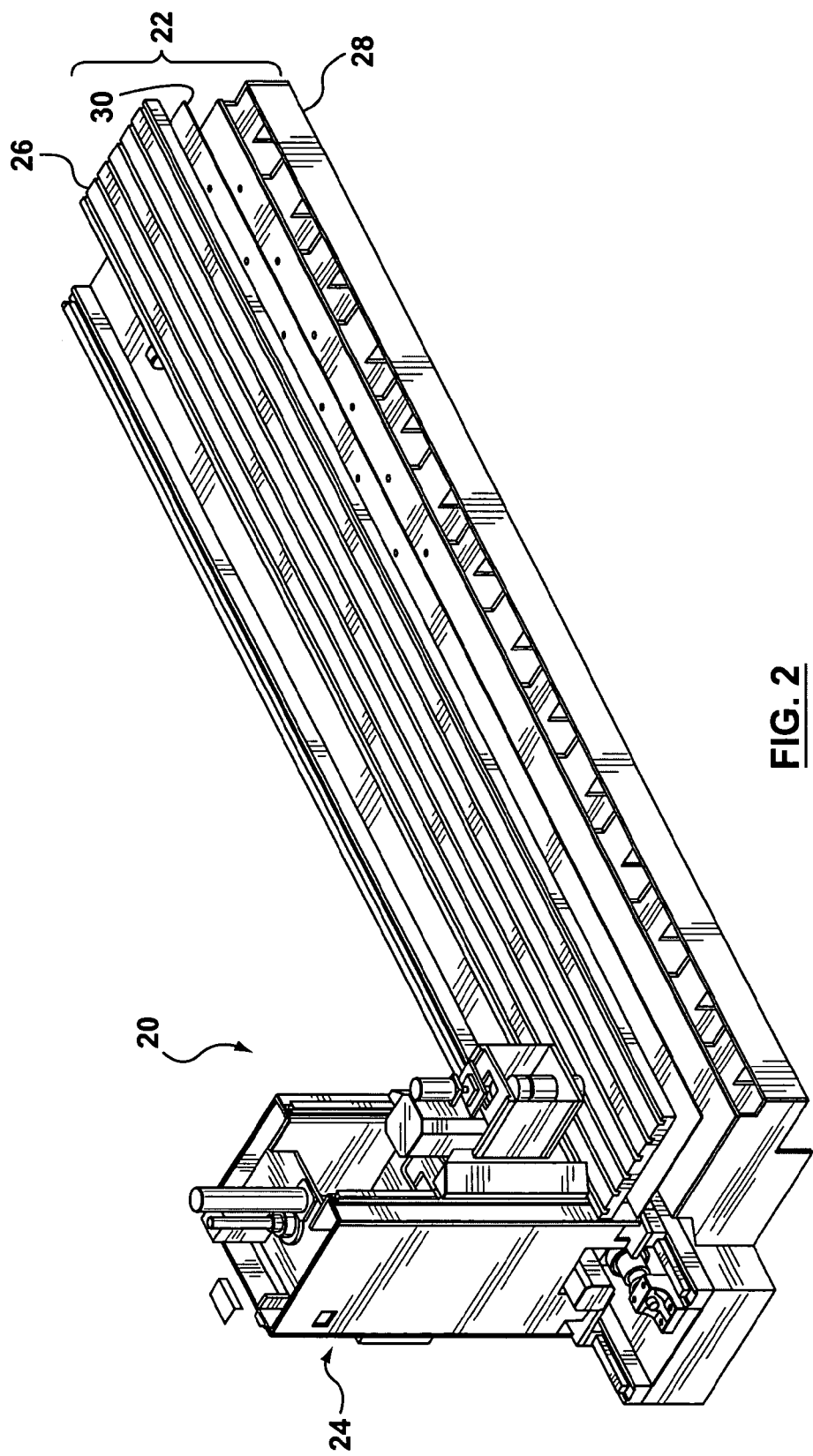
FIG. 2 is a partially exploded isometric view of a preferred embodiment of a machine tool of the invention showing a sheet of damping material included in a base component.
Figure 3:
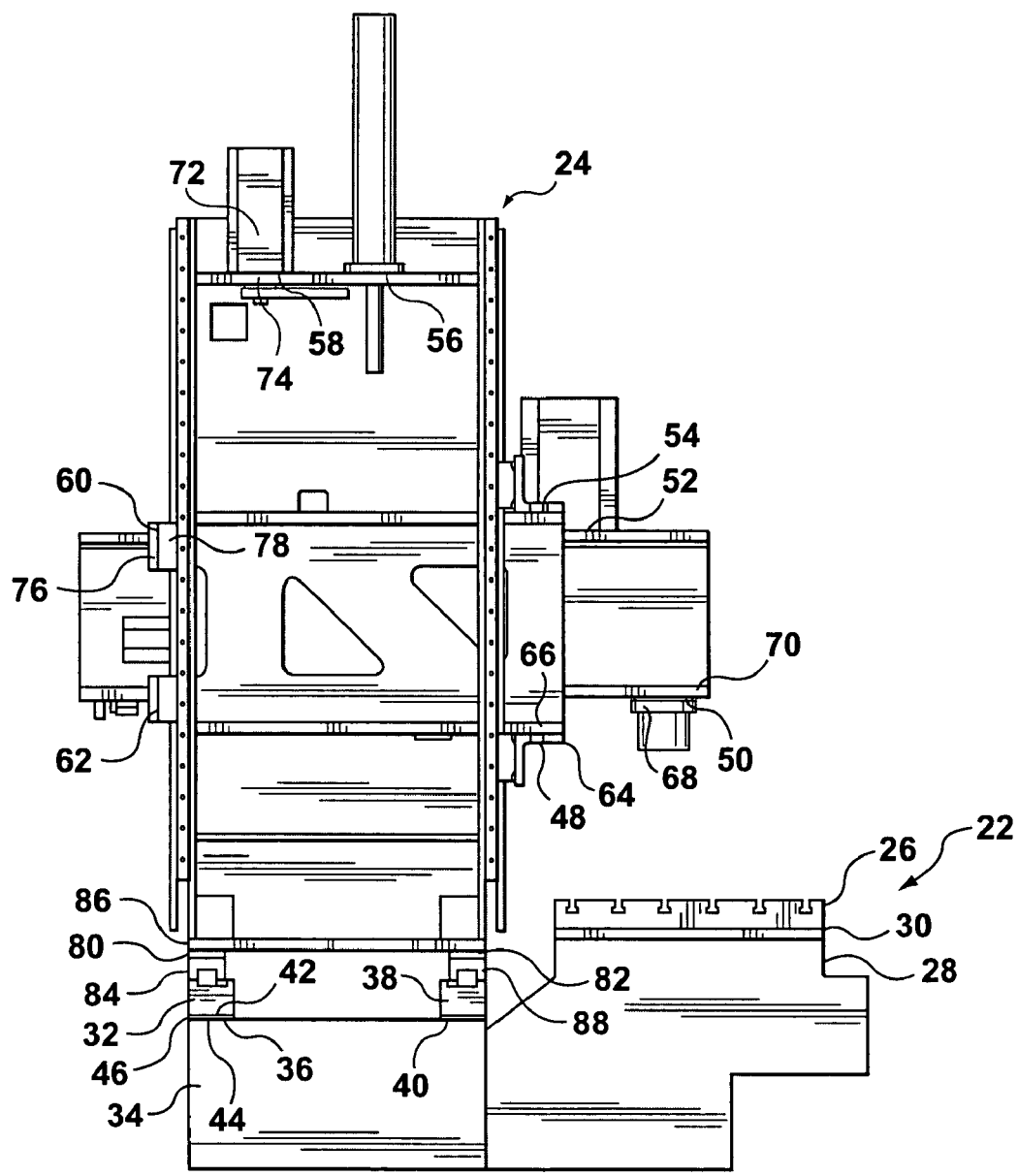
FIG. 3 is a cross-section of the machine tool of FIG. 2, showing the base component and a column component and sheets of damping material positioned therein.
Figure 4:
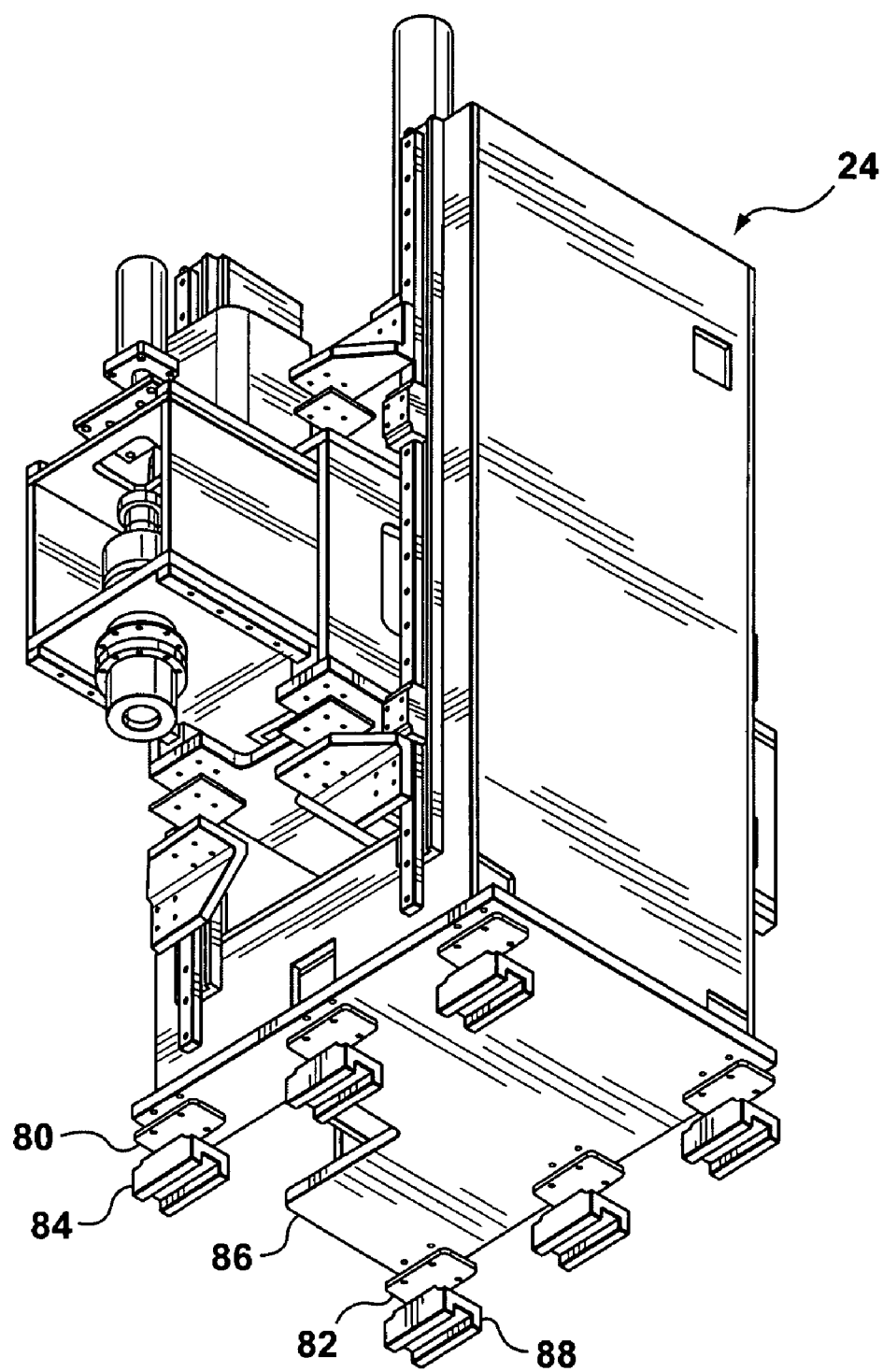
FIG. 4 is a partially exploded isometric view of the column component of the machine tool of FIG. 2, drawn at a larger scale, showing the positioning of sheets of damping material in the column component.

Reference is first made to FIGS. 2–4 to describe a preferred embodiment of a machine tool indicated generally by the numeral 20 in accordance with the invention. The machine tool 20 is adapted for performing a machine tool function and, as shown in FIG. 2, includes components 22, 24 which cooperate with each other to execute the machine tool function, as will be described. The component 22 includes constituent parts 26, 28 with a sheet 30 of damping material interposed between the constituent parts 26, 28 for limiting vibration of the machine tool 20 while the machine tool function is performed.

FIG. 3 shows the column component 24 with constituent parts 32, 34 with a sheet of damping material 36 interposed, or sandwiched, therebetween. Similarly, a constituent part 38 is positioned adjacent to the constituent part 34, and a sheet of damping material 40 is sandwiched therebetween.

As can be seen in FIG. 3, the constituent parts 32, 34 each include surfaces 42, 44 respectively which cooperate to define a slot 46 in which the sheet 36 is receivable.

It will be appreciated that the other constituent parts forming the components also have surfaces adapted to cooperate with other surfaces on adjacent constituent parts to define slots. For example, as can be seen in FIG. 3, sheets of damping material 48, 50, 52, 54, 56, 58, 60, and 62 are shown in FIG. 3 as being included in the column component 24. It will be understood that the sheets of damping material are interposed between constituent parts in each case.

As can be seen in FIG. 4, it is important that the sheet in each case be interposed between the constituent parts, to prevent the constituent parts from contacting each other.

By way of example, sheets 48 and 50 are interposed, or sandwiched, between constituent parts 64, 66 and 68, 70 respectively. Similarly, sheets 58 and 60 are sandwiched between constituent parts 72, 74 and 76, 78 respectively.

Additional examples are provided by sheets 80 and 82 which are interposed between constituent parts 84, 86 and 88, 86 respectively. The sheets 80, 82 and constituent parts 84, 86, and 88 are also shown in FIG. 4. FIG. 4 also shows a number of additional examples of sheets of damping material placed between constituent parts to form the component 24.

In order to maintain stiffness for stable machining conditions, the sheets of damping material should be relatively non-resilient. In addition, the sheets should also be impermeable to various compounds (oils, greases, machine coolants, and solvents) which may come into contact with the damping material sheets. For this reason, in the preferred embodiment, the sheets are made of polyvinylchloride.

Preferably, the thickness of the sheets of damping material varies from between 0.01 inch and 0.02 inch. The adjacent constituent parts are fastened together, with the sheet of damping material positioned between the constituent parts. Preferably, bolts are used, and are positioned in aligned holes drilled through the constituent parts and formed in the sheet of damping material. However, any other suitable method may be used to fasten the constituent parts together with the sheets of damping material interposed between them.

In use, each component of the machine tool 20 is made up of at least two constituent parts. The constituent parts include surfaces. When a constituent part is properly positioned in proximity to the other constituent part in its pair, the constituent parts present surfaces positioned opposite to each other, and substantially parallel to each other. Such surfaces define a slot in which a sheet of damping material is receivable. The damping material is configured so that it prevents the constituent parts in the pair from directly contacting each other. Due to the insulation of the constituent parts in the pair from each other due to the damping material, vibration produced by the machine tool 20 is effectively dampened.

The constituent parts are preferably made of steel, and are substantially rigid. Among the advantages of the machine tool 20 are the ability to use machined steel parts as the constituent parts in its construction, rather than having to use castings. Machined steel parts are typically less expensive to produce than castings.

The structure of the machine tool 20 results in damping of the vibration resulting from operation of the machine tool but also provides the stiffness required for the machining conditions experienced. The noise produced during operation of the machine tool 20 is reduced by as much as one-fifth.

It will be evident to those skilled in the art that the invention can take many forms, and that such forms are within the scope of the invention as claimed. Therefore, the spirit and scope of the appended claims should not be limited to the description of the preferred versions contained herein.

The invention claimed is:

1. A machine tool for performing a machine tool function including a plurality of components adapted to cooperate with each other to execute the machine tool function, the plurality of components including a stationary base on which the machine tool is supported, the machine tool having:
   a plurality of constituent pans, each said constituent part being substantially rigid;
   a plurality of sheets of damping material, each comprising polyvinylchloride with a thickness between approximately 0.01 inch and approximately 0.02 inch;
   each said sheet having at least one hole formed therein;
   each said component comprising at least two of said constituent pans and at least one of said sheets, said at least one sheet being interposed between said at least two constituent pans, to prevent said at least two constituent pans from contacting each other;
   each said constituent pan including at least one first surface adapted to cooperate with at least one second surface on an adjacent constituent pan to define a slot in which said at least one sheet is receivable, said at least one sheet being interposed between said at least one first surface and said at least one second surface to form each said component;
   each said sheet being substantially planar and substantially non-resilient;
   and each of said at least two constituent parts having at least one hole drilled therein respectively, each said at least one hole in each said constituent part being substantially aligned with said at least one hole in said at least one sheet to receive a bolt for fastening said at least two constituent parts together with said at least one sheet positioned therebetween, to form each said component,
   whereby vibration of the machine tool while performing the machine tool function is damped by said sheets of damping material.

2. A machine tool according to claim 1 in which each said sheet is substantially impermeable.

3. A machine tool according to claim 1 in which each said constituent part comprises machined steel.

4. A machine tool for performing a machine tool function including a plurality of components adapted to cooperate with each other to execute the machine tool function, the plurality of components including a stationary base on which the machine tool is supported, the machine tool having:
   a plurality of constituent parts, each said constituent part being substantially rigid;
   a plurality of linings for damping vibration of the machine tool during performance of the machine tool function, each said lining being substantially planar;
   each said component comprising at least two of said constituent parts and at least one of said linings sandwiched therebetween, to prevent the constituent parts from contacting each other;
   each said lining being polyvinylchloride, being substantially non-resilient and having a thickness between approximately 0.01 inch and approximately 0.02 inch;
   each said lining having at least one hole formed therein;
   one of said at least two constituent parts having at least one first mating surface adapted to cooperate with at least one second mating surface of the other of said at least two constituent parts to define a slot for receiving said at least one lining, said at least one lining being configured to maintain contact with said at least one first mating surface and with said at least one second mating surface when said at least one lining is positioned therebetween such that vibration of the machine tool during performance of the machine tool function is damped by said at least one lining; and each of said at least two constituent parts having at least one hole drilled therein, each said at least one hole being substantially aligned with said at least one hole in said lining to receive a bolt for fastening said at least two constituent parts together with said lining positioned therebetween to form each said component, whereby vibration of the machine tool is damped by said linings in said components.

5. A machine tool according to claim 4 in which each said lining is substantially impermeable.

6. A machine tool according to claim 4 in which each said constituent part comprises machined steel.

7. A method of damping vibration of a machine tool, the machine tool being adapted to perform a machine tool function and including a plurality of machine tool components adapted to cooperate with each other to execute the machine tool function, the plurality of components including a stationary base on which the machine tool is supported, the method comprising the steps of:
  (a) providing at least two constituent parts for each said component, each said constituent part being substantially rigid, each said constituent part having at least one hole drilled therein;
  (b) providing at least one sheet of polyvinylchloride damping material for each said component, said at least one sheet of damping material having a thickness between approximately 0.01 inch and approximately 0.02 inch and having at least one hole formed therein;
  (c) forming each said component by interposing said at least one sheet of damping material between said at least two constituent parts, said at least one sheet of damping material being substantially non-resilient, said at least one hole in said at least one sheet of damping material being substantially aligned with said holes drilled in said at least two constituent parts; and
  (d) inserting a bolt into said at least one hole in said at least one sheet of damping material and said holes drilled in said at least two constituent parts to fasten said at least two constituent parts together with said at least one sheet of damping material positioned therebetween to form each said component, whereby said at least one sheet of damping material dampens vibration of the machine tool during performance thereby of the machine tool function.

8. A method according to claim 7 in which each said constituent part comprises machined steel.

9. In a machine tool adapted for performing a machine tool function, the machine tool including a plurality of components adapted for cooperation with each other to execute the machine tool function, the plurality of components including a stationary base on which the machine tool is supported, the improvement comprising each said component including at least two constituent parts, each said constituent part being substantially rigid, one of said at least two constituent parts having at least one first surface and the other of said at least two constituent parts having at least one second surface positioned parallel to said at least one first surface to define an aperture therebetween, and at least one sheet of polyvinylchloride damping material having a thickness between approximately 0.01 inch and approximately 0.02 inch and being receivable in the aperture between said at least one first surface and said at least one second surface to be sandwiched therebetween for dampening vibration of the machine tool, said at least one sheet being substantially non-resilient, said at least one sheet having at least one hole formed therein, each of said at least two constituent parts having at least one hole drilled therein respectively, each said hole in said at least two constituent parts being substantially aligned with said at least one hole in said at least one sheet of damping material to receive a bolt for fastening said at least two constituent parts together with said at least one sheet positioned therebetween to form each said component, whereby said at least one sheet of damping material dampens vibration of the machine tool during performance thereby of the machine tool function.

10. A component in the form of a stationary base on which a machine tool is supported to be included the in machine tool, said component having predetermined dimensions, the component including:
  at least two constituent parts, each said constituent part being formed of substantially rigid material;
  at least one sheet of polyvinylchloride damping material, said at least one sheet of damping material being substantially non-resilient;
  said at least two constituent parts cooperating with each other to form at least one slot in which said at least one sheet is receivable;
  said at least one sheet separating each of said at least two constituent parts from each other to limit vibration of the machine tool;
  said at least one sheet of damping material having a thickness between approximately 0.01 inch and approximately 0.02 inch and having at least one hole formed therein;
  each of said at least two constituent parts having at least one hole drilled therein respectively; and
  each said hole in said at least two constituent parts being substantially aligned with said at least one hole in said at least one sheet of damping material to receive a bolt for fastening said at least two constituent parts together with said at least one sheet of damping material positioned therebetween to form said component.

* * * * *

UNITED STATES PATENT AND TRADEMARK OFFICE
CERTIFICATE OF CORRECTION

| | | |
|---|---|---|
| PATENT NO. | : 7,125,211 B2 | Page 1 of 1 |
| APPLICATION NO. | : 10/686603 | |
| DATED | : October 24, 2006 | |
| INVENTOR(S) | : Don Zoran | |

It is certified that error appears in the above-identified patent and that said Letters Patent is hereby corrected as shown below:

At column 4, line 5, the word "pans" should be replaced with the word --parts--.

At column 4, line 12, the word "pans" should be replaced with the word --parts--.

At column 4, line 14, the word "pans" should be replaced with the word --parts--.

At column 4, line 15, the word "pans" should be replaced with the word --parts--.

At column 4, line 16, the word "pan" should be replaced with the word --part--.

At column 4, line 18, the word "pan" should be replaced with the word --part--.

Signed and Sealed this

Fourteenth Day of April, 2009

JOHN DOLL
*Acting Director of the United States Patent and Trademark Office*